United States Patent
Chan et al.

(10) Patent No.: US 6,192,411 B1
(45) Date of Patent: *Feb. 20, 2001

(54) MAPPING SNA SESSION FLOW CONTROL TO TCP FLOW CONTROL

(75) Inventors: Barry K. Chan, Beecroft (AU); Michael Boe, San Francisco, CA (US)

(73) Assignee: Cisco Technology, Inc., San Jose, CA (US)

( * ) Notice: Under 35 U.S.C. 154(b), the term of this patent shall be extended for 0 days.

This patent is subject to a terminal disclaimer.

(21) Appl. No.: 09/436,678

(22) Filed: Nov. 9, 1999

Related U.S. Application Data

(63) Continuation of application No. 08/920,392, filed on Aug. 29, 1997, now Pat. No. 6,049,833.

(51) Int. Cl.[7] .............................. H04L 12/46; G06F 15/16
(52) U.S. Cl. .................... 709/232; 709/236; 709/237; 709/231; 709/230; 709/223
(58) Field of Search ..................................... 709/232, 224, 709/230, 231, 237, 233, 236, 246; 370/256, 402, 401, 465

(56) References Cited

U.S. PATENT DOCUMENTS

| | | | |
|---|---|---|---|
| 4,545,013 | 10/1985 | Lyon et al. ............................ | 364/200 |
| 4,644,532 | 2/1987 | George et al. ........................ | 370/94 |
| 4,750,109 | 6/1988 | Kita ...................................... | 364/200 |
| 4,827,411 | 5/1989 | Arrowood et al. .................. | 364/300 |
| 4,893,307 | 1/1990 | McKay et al. ....................... | 370/94.1 |
| 4,922,486 | 5/1990 | Lidinsky et al. ..................... | 370/60 |
| 4,965,772 | 10/1990 | Daniel et al. ........................ | 364/900 |
| 5,021,949 * | 6/1991 | Morten et al. ....................... | 709/231 |
| 5,046,066 | 9/1991 | Messenger .......................... | 370/94.1 |
| 5,050,165 | 9/1991 | Yoshioka et al. ................... | 370/85.13 |
| 5,226,120 | 7/1993 | Brown et al. ........................ | 395/200 |
| 5,287,103 | 2/1994 | Kasprzyk et al. ................... | 340/825.52 |
| 5,371,852 | 12/1994 | Attanasio et al. ................... | 395/200 |
| 5,379,296 * | 1/1995 | Johnson et al. ..................... | 370/402 |
| 5,442,633 | 8/1995 | Perkins et al. ...................... | 370/94.1 |
| 5,473,608 | 12/1995 | Gagne et al. ........................ | 370/85.13 |
| 5,491,796 | 2/1996 | Wanderer et al. ................... | 395/200.09 |
| 5,517,622 * | 5/1996 | Ivanoff et al. ....................... | 709/232 |
| 5,526,358 | 6/1996 | Gregerson et al. ................. | 370/94.3 |
| 5,539,736 * | 7/1996 | Johnson et al. ..................... | 370/402 |
| 5,544,162 | 8/1996 | Mraz et al. .......................... | 370/60 |
| 5,557,798 | 9/1996 | Skeen et al. ........................ | 395/650 |
| 5,559,955 | 9/1996 | Dev et al. ............................ | 395/182.02 |
| 5,583,862 | 12/1996 | Callon ................................. | 370/397 |
| 5,586,254 | 12/1996 | Kondo et al. ....................... | 395/200.1 |
| 5,588,119 | 12/1996 | Vincent et al. ..................... | 395/200.15 |
| 5,684,967 | 11/1997 | McKenna et al. .................. | 395/329 |
| 5,684,988 | 11/1997 | Pitchaikani et al. ................ | 395/615 |
| 5,737,525 | 4/1998 | Picazo, Jr. et al. ................ | 395/200.02 |
| 5,754,830 | 5/1998 | Butts et al. ......................... | 395/500 |
| 5,796,728 | 8/1998 | Rondeau et al. .................... | 370/338 |
| 5,802,053 * | 11/1998 | Bollella et al. ..................... | 370/401 |
| 5,802,313 | 9/1998 | Mitchell et al. .................... | 395/200.68 |
| 6,049,833 * | 4/2000 | Chan et al. ......................... | 709/237 |

OTHER PUBLICATIONS

Printout of World Wide Web page http://www.ctron.com/products/items/SPECTRUM–BLUEVISION entitled "SPECTRUM/Blue Vision—for integrated SNA/LAN management", copyright 1995, 1996.

* cited by examiner

*Primary Examiner*—Dung C. Dinh
*Assistant Examiner*—Abdullahi E. Salad
(74) *Attorney, Agent, or Firm*—Cesari and McKenna, LLP

(57) ABSTRACT

A TN3270 server (26) that forwards a 3270 data stream from a Systems Network Architecture ("SNA") connection (28) to a Transmission Control Protocol ("TCP") connection (24) monitors the TCP connection for segments that acknowledge thereby-transmitted bytes. It also keeps track of the unacknowledged-byte window sizes specified by received TCP-connection -segments. It responds with a pacing response to a pacing-request-containing SNA message only when forwarding of previously received information from the SNA can be completed without resulting in a number of unacknowledged bytes that exceeds the specified window size.

8 Claims, 4 Drawing Sheets

MAPPING SNA SESSION FLOW CONTROL TO TCP FLOW CONTROL

CROSS-REFERENCE TO RELATED APPLICATION

This is a continuation of commonly assigned U.S. patent application Ser. No. 08/920,392, which was filed on Aug. 29, 1997, by Chan et al., now U.S. Pat. No. 6,049,833, for Mapping SNA Session Flow Control to TCP Flow Control and is hereby incorporated by reference.

BACKGROUND OF THE INVENTION

The present invention is directed to computer communications and in particular to gateways that mediate communications between processes that employ different network-communications protocols.

A large installed base of computer equipment employs a communications protocol known as Systems Network Architecture ("SNA"), which specifies the manner in which a host computer, for example, will communicate over a network with a device such as a printer. In a typical system, such as that depicted by FIG. 1, a host mainframe computer 12 transmits a report to a printer 14. The data sent to the printer are lines of EBCDIC characters and display parameters that take the form of a "3270 data stream," so called because it is the form employed by IBM terminals and devices referred to as "3270s."(Actually, not all "3270"-device names take the form 327x, but all such devices do use the 3270 data stream).

To ensure that this data stream arrives intact at the proper location, a communications controller 16 breaks it into segments that it encapsulates in message units whose typical format FIG. 2 depicts. If it employs the Synchronous Data Link Control ("SDLC") protocol to transmit the SNA-protocol information, the communications controller 16 and a cluster controller 18 with which it communicates employ FIGS. 2's linkheader and link-trailer fields to direct the resultant message units to the right data-link stations, frame the message units properly, specify the manner in which link-level operations should interpret them, and detect transmission errors. The data-link station must be specified because the other stations on the link may receive the same signal. Each of the SDLC stations may provide a link-level interface for many of the hardware/software entities ("network-addressable units") that the SNA protocol can separately address, and it may need to forward messages to other link stations, which provide link interfaces for further network-addressable units. FIG. 2's transmission header specifies the origin and destination network-addressable units and provides certain format and sequencing information.

FIG. 2's request/response unit contains the payload delivered to the software that handles be SNA operations. Much of the time the request/response unit includes segments from the data stream to be forwarded to the printer (or other ultimate user), but request/response units come in many different types, and most of the different types represent commands or information for the SNA-operations software itself rather than printer data or commands.

To specify the request/response-unit type and support various housekeeping tasks, the message unit further includes a request/response header. That header's format is not fixed, but the format most frequently encountered is the three-byte format whose features most relevant to the present discussion FIG. 2's second row depicts. An "RU category" field in the request/response header, together with a code field (not separately shown) in the request/response unit itself specifies the request/response unit's type.

One feature of the SNA protocol is that the nature of a given message type may necessitate a response. For instance, a receiving device may have to have completed its reaction to a certain type of message before it can properly carry out subsequent messages' commands. In such a case, the transmitting device will need to receive a response to the first message before it sends certain subsequent messages. The mechanism for providing such type-specific responses is the first, "RRI" (request/response indicator) bit of the request/response header" first byte. If message of a given type has an RRI-bit a value of "1," that message is a response to a message of the same type, whose RRI bit was a "O."

Separate from such type-specific responses are pacing responses, which are used in accommodating differences between different devices' rates of operation. For example, the rate at which FIG. 1's host 12 can transmit information through the various communications links typically exceeds the rate at which the printer 14 can print it. So the printer's buffer space would soon overflow if the host transmission rate were not regulated in response to the pace of the printer's operation.

To provide such regulation, the printer 14 may inform the host 12 at the beginning of a communications session that a "pacing window" of a given size should be used throughout the session. (Actually, the cluster controller 18 is what would typically run the software for handling SNA communications on the printer's behalf, but it bases the pacing-window size on the nature of the peripheral device—i.e., the printer—on whose behalf it is communicating.) As will shortly be apparent, use of a given window size limits to one less than twice the pacing-window size the maximum number of request RUs—i.e., the number of RUs in which the RRI bit is "0"—that can be sent without receiving a "pacing response."

For the sake of concreteness, let us assume that the specified window size is four. This means that the host 12 sets the PI bit to a "1" in every fourth request unit, leaving it a "0" in all others. In essence, inclusion of this bit in the first of our request units asks the receiver for permission to send four further request messages after the current four have been sent.

To grant this permission, the printer sends a pacing response, which can take several forms. If the request unit containing the pacing request is of the type that requires a type-specific response, the PI bit is simply set in that response message. Otherwise, the receiver sends one of two message types, which are know in SNA terminology as IPR (Independent Pacing Response) or IPM (Independent Pacing Message) types, the latter type having the additional fimction of changing the pacing-window size. In any event, the host could conceivably receive the pacing response before it has sent any further request units, in which case it would actually be permitted to send seven request units without receiving a further pacing response. But this is the maximum number permitted: if the pacing-window size is n, 2n−1 is the maximum number of requests that can be sent without receiving an intervening pacing response.

Although SNA is the protocol by which a large installed base of computer systems communicate, a protocol that has enabled many disparate systems to communicate with each other over a wide variety of physical communications media is a different one: the Transmission Control Protocol/Internet Protocol ("TCP/IP"). To enable customers to communicate with SNA-compliant systems but take advantage of the large number of TCP/IP links, communications-equipment manufactures have built communications gateways that translate between the two protocols. FIG. 1 also depicts a typical gateway environment.

In a typical system, the host 12 transmits, say, a report to terminal equipment 22. Equipment 22 may take the form of a printer driven by personal computer equipped with a modem. For this purpose, the user employs an Internet path 24—i.e., it employs the TCP/IP communications protocol—to establish a Telnet connection.

The client terminal 22 is sometimes referred to as a TN3270 emulator. The "3270" refers to the 3270 data stream, while the "TN" refers to the Telnet connection. Such communication also requires a TN3270 server such as server 26. Although the host in which the target application is running sometimes performs the TN3270-server process, having it do so is usually considered too prodigal a use of mainframe cycles. So FIG. 1 includes a communications channel 28 between the host 12 and the TN3270 server 26 to indicate that the TN3270 server 26 is embodied in separate hardware, and the host 12 employs the SNA protocol to communicate with the server 26, which therefore acts as a gateway between the different protocol regimes.

The Telnet connection is well known to the Internet community and described in its Requests for Comments ("RFCs") 854, 860 and 862, while RFCs 1576 and 1647 describe the TN3270 extensions to the base Telnet specification. Briefly, Telnet-implementing software typically maps the user's actual physical terminal to a "network virtual terminal," or NVT. An NVT receives and transmits the TCP-segment data as a byte stream. It interprets a byte whose first bit is zero as a symbol from "NVT ASCII," a seven-bit U.S. variant of the ASCII character set that the Internet protocol suite uses to represent letters, numbers, line feeds, carriage returns, etc. A Telnet connection also provides for in-band signaling: if the Telnet port receives an IAC ("Interpret As Command") byte, whose value is 255 (=$FF_H$), the next byte is ordinarily interpreted as a command, and that next byte may in turn indicate that a further byte or bytes should similarly be interpreted as commands.

Because they are two different protocols, SNA/TN3270 installations tend to handle the pacing problem differently from SNA-only installations. Typically, the TN3270 server 26 acts as a buffer and thus shields the host-to-server channel 28 from the client terminal 22's speed limitations. This is a natural division of labor; although the TN3270server 26 receives the 3270 data stream in SNA message units, it forwards it in TCP segments, so the TN3270 client 22 cannot receive the SNA pacing bit.

SUMMARY OF THE INVENTION

But we have recognized that server hardware costs can be reduced significantly if a way can be devised to reflect the Telnet terminal's processing capacity back to the SNA network. Doing so would eliminate much of the server's disc-space requirement, which can be a significant contributor to the overall cost of a server that must handle a large number of concurrent TN3270 sessions.

Now, one might propose to accomplish this result by substituting a corresponding Telnet feature and have the TN3270 server 26 translate between that feature and the SNA pacing feature. As RFC860 explains, a user or process at one end of a Telnet connection can employ a "timing mark" feature to ensure that previously transmitted data have been completely processed. One might therefore propose that the TN3270 server 26 respond to a pacing request from the host 12 by inserting into the data stream a three-byte sequence represented by the Telnet mnemonic <IAC, DO, TM>. The IAC byte, as was explained above, is the break character that introduces a command. The DO byte (=$FD_H$) in turn indicates an option negotiation, and the TM byte (=$06_H$) specifies that the negotiated option is the one known as the "timing mark." This command takes the form of a "negotiation" because a Telnet receiver is not in general capable of implementing every requested option. To indicate that it can and will comply with the requested option, a receiver inserts the sequence <IAC, WILL, TM> into the data stream that it sends in return; the WILL byte (=$FB_H$) denotes compliance with a requested option. (Actually, in the specific case of a TM negotiation, it does not matter whether the response is WILL or the complementary WON'T, because both responses result in an end-to-end acknowledgement.) So one could configure the TN3270 client 22 to respond to initiation of a timing-mark negotiation by transmitting that sequence as soon as it has enough buffer space to store a pacing window's maximum data load.

But we have also recognized that such a translation's data-exchange, timing, and sizing would compromise the attractiveness that the storage-capacity reduction would otherwise afford, and we have identified an exceedingly simple alternative. Specifically, we simply have the TN3270 server send the pacing response only if forwarding any remaining previously information would not result in a number of unacknowledged bytes that exceeds the specified window size. As will be explained below, this approach automatically accommodates the SNA-session pace to the client terminal's processing capability without affecting the 3270 data stream at all.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
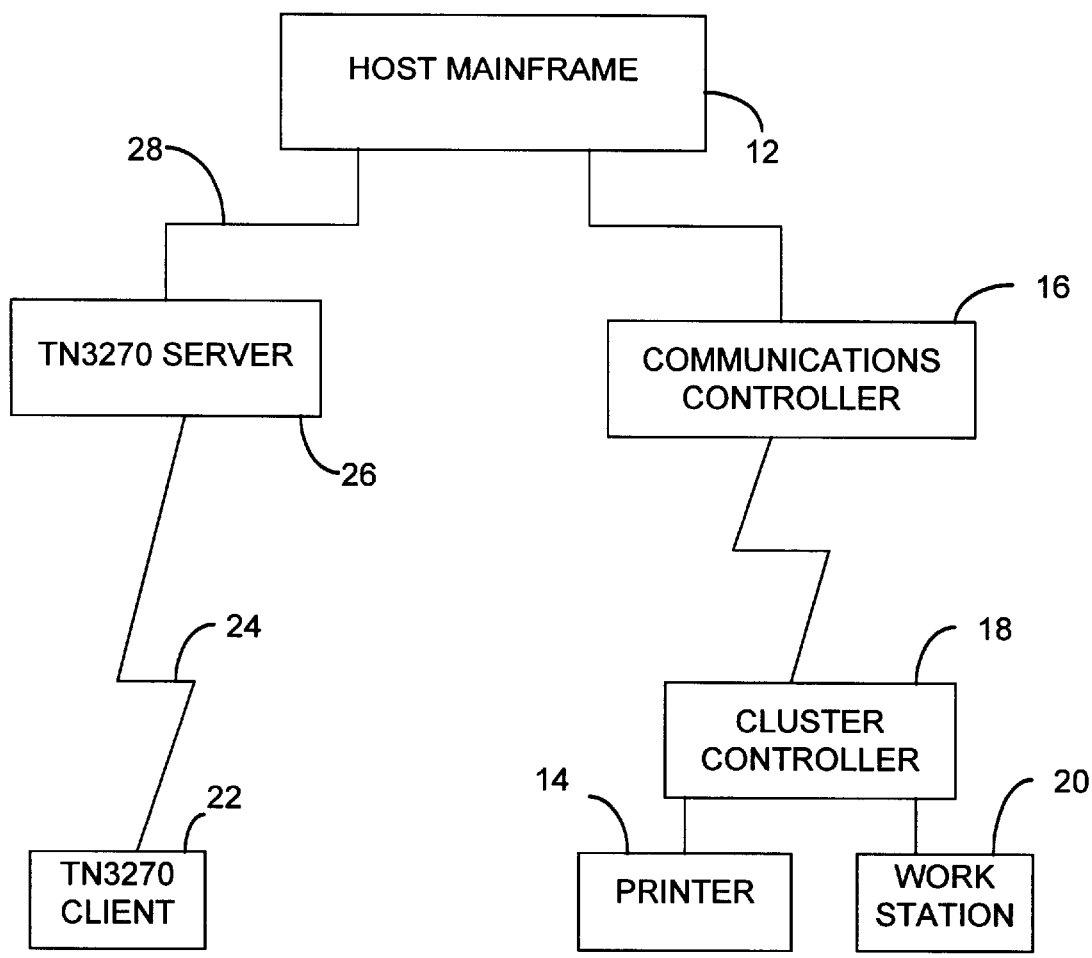
FIG. 1, described above, is a block diagram of a communications system that can use the present invention's teachings.
Figure 3:
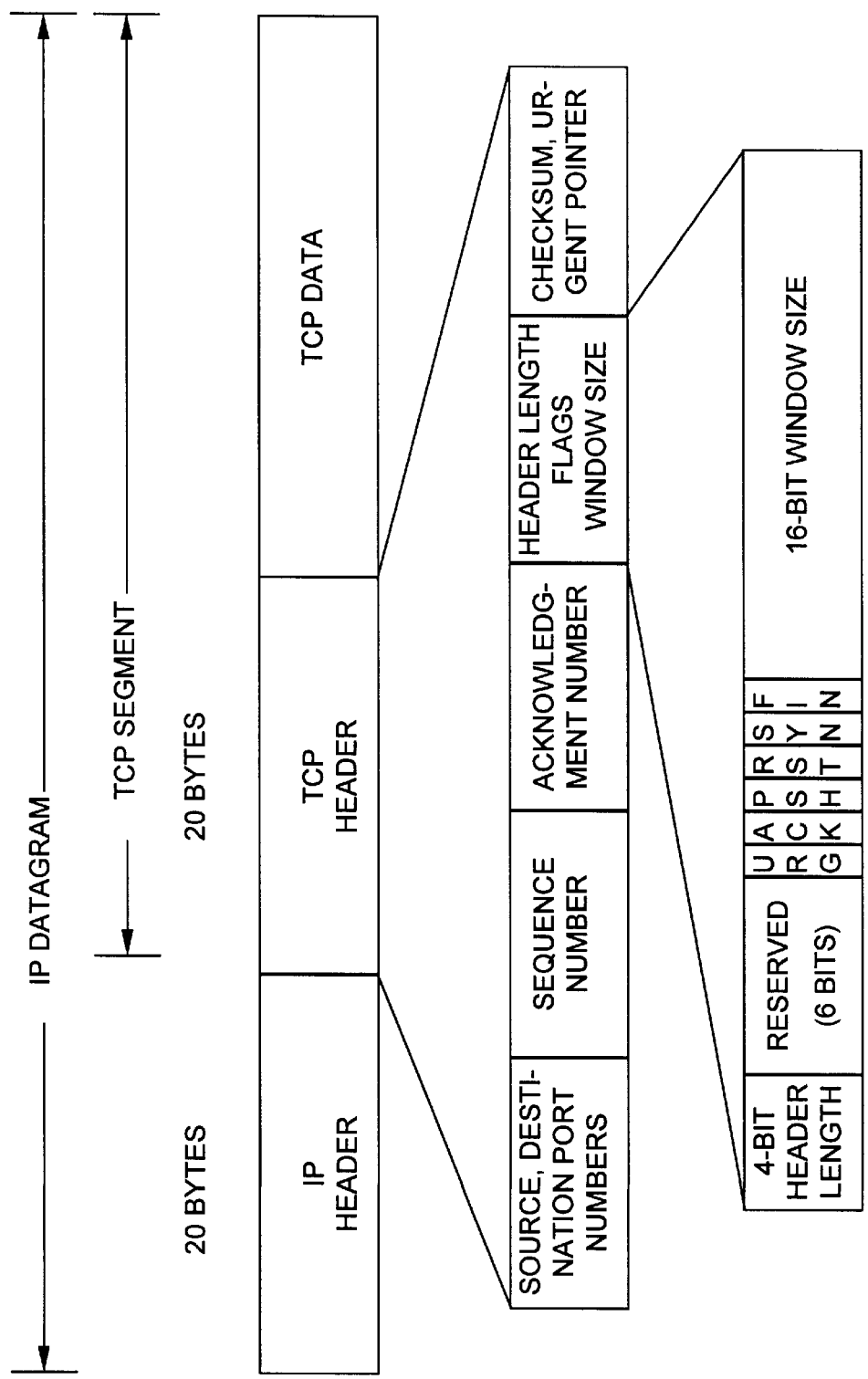
FIG. 3 is a diagram of a typical Internet Protocol datagram.

To appreciate the manner in which FIG. 1's server 26 can take advantage of the existing Internet requirements on link 24 to cause the TN3270 client 22's speed limitations to be reflected into the SNA link 28's session pacing, we need to consider the format of the datagram that encapsulate the Telnet byte stream. FIG. 3's top row depicts the datagram as consisting of an Internet Protocol ("IP") header, a Transmission Control Protocol ("TCP") header, and TCP data, i.e., the Telnet byte stream by which the 3270 data stream is transferred. The organization of these headers is well known to the Internet community, so the discussion that follows will concentrate only on those features particularly relevant to an understanding of the present invention.

For the sake of simplicity, FIG. 3's second row depicts the TCP header as organized into five four-byte fields, although those skilled in the art will recognize that such headers may additionally include further, optional fields. Of particular interest in connection with the present invention are the second, third, and fourth fields. One of the purposes of the TCP header is to ensure that all data transmitted to a TCP port has been properly received. To this end, initiation of each of the two one-way TCP connections required for a TCP dialog involves assigning a respective initial "sequence number," and every byte in the byte stream sent in one direction is numbered in succession from that initial value. The TCP header's second, "sequence number" field contains the number assigned to the last byte in the TCP segment that includes it. The transmitting port is assured that a segment is properly received if it thereafter receives an acknowledgment from the recipient that it has received all bytes through that sequence number or a subsequent one.

The acknowledgment mechanism involves a single-bit acknowledgment ("ACK") flag. FIG. 3's third row depicts that flag's position in the TCP header's fourth field. A port sets this flag in a given segment to indicate that the number in the third of the TCP header's four-byte fields exceeds by one the sequence number of the last byte that the port has successfully received.

The process that should receive the acknowledgment uses it in two ways. First, if it receives no such acknowledgment within a predetermined time limit, it re-transmits the unacknowledged segment. Second, it makes no transmissions unless the resultant number of unacknowledged bytes will be less than or equal to a predetermined window size, which the acknowledging process advertises in the window-size field of FIG. 3's third row.

Figure 2:
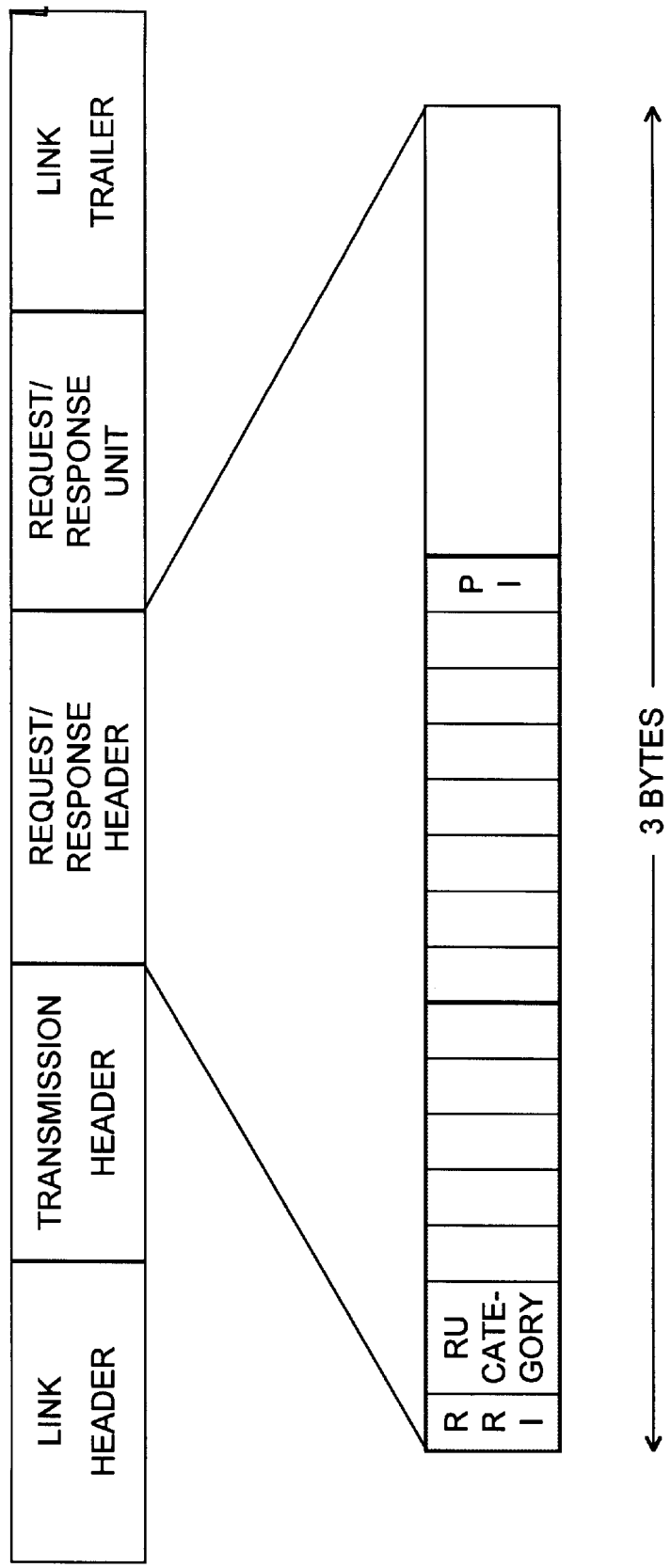
FIG. 2, described above, is a diagram of a typical SNA message unit transmitted by the Synchronous Data Link Protocol.
Figure 4:
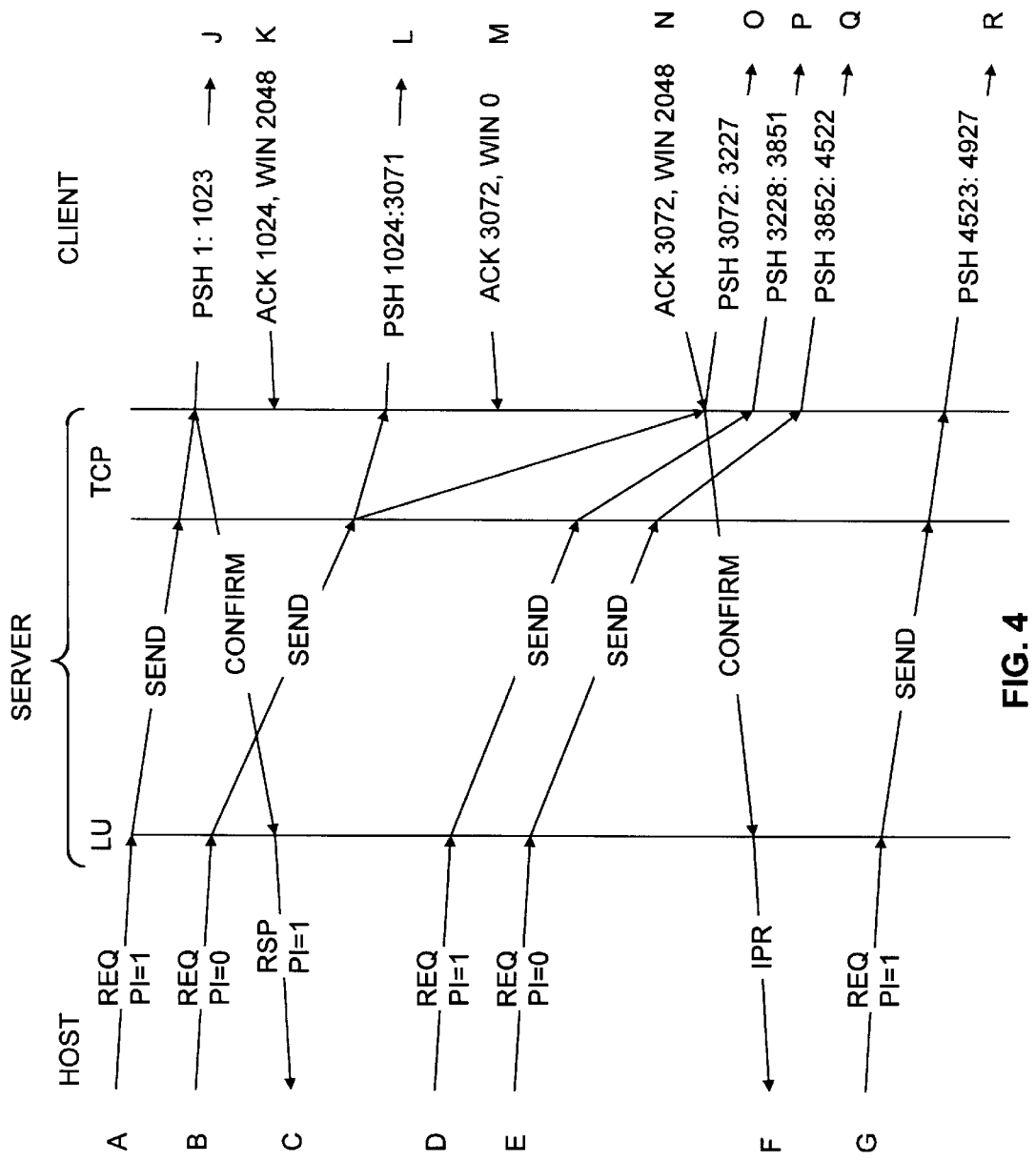
FIG. 4 is a diagram of a communications scenario that illustrates the present invention's teachings.

FIG. 4 depicts a scenario that illustrates the latter feature and the manner in which we take advantage of it to cause the SNA session pacing to reflect the Telnet client's speed limitation. The host sends the server a message A whose type the drawing does not specify but merely represents as "Req" to indicate that the message's RRI flag (FIG. 2) is a "0" i.e., that message A is not a response to a same-type message. The "PI=1" notation indicates that its pacing bit is set: message A requests a pacing response.

The server typically includes a digital computer whose programming configures it to perform several processes. The process that handles the SNA communication is commonly known as a logical unit ("LU"), and the server's supervisory process responds to the LU's reception of message A by requesting that the TCP process send message A's contents as TCP data. The TCP process responds by sending a TCP segment J whose header includes a set PSH flag (see FIG. 3's third row). The set PSH flag tells the receiving TCP process that the contained data should be forwarded immediately to the receiving user process, which is a Telnet process in this case. The drawing's "1:1023" notation signifies that the sequence number of the first byte thereby sent is 1 and that of the last byte in the segment is 1023. (Actually, the sequence number of a connection's first byte is usually set somewhat arbitrarily; it is rarely 1.) As was explained above, message A's set PI bit requests a pacing response, but we will assume that the pacing window in the example is 2, so the host can send a further message B without first receiving the pacing response. Also, since the pacing-window size is 2, message B's pacing indicator is not set.

In accordance with the present invention, the server's supervising process operates the LU to send a pacing response only in situations in which TCP transmission of all data not yet transmitted would result in a number of unacknowledged bytes less than or equal to the TCP window size. We assume that this criterion is met in the case of message A, so the server invokes an LU function, styled "Confirm" in FIG. 4, that transmits the appropriate pacing response. For the sake of example we assume that the pacing-indicator-containing request message A's type is one that requires a response regardless of whether its pacing indicator is set. In such a situation, the appropriate pacing response may be a set pacing-indicator bit in the required response message C, whose type is the same as that of message A. (For the sake of simplicity, FIG. 4 omits any other required response messages.)

The pacing response grants the host permission to begin a further pacing window, so it sends message D. Since message D is the first message in the next pacing window, its pacing indicator is set: the host requests permission to send another pacing window after the window thereby begun is completed.

But permission in the form of a pacing response is not immediately forthcoming, because, as a result of message B, the number of unacknowledged bytes exceeds the pacing-window size. More specifically, segment K has acknowledged TCP segment J's 1023 bytes, as the "ACK 1024" notation indicates, and segment K has advertised a window of 2048 bytes, as the "WIN 2048" notation indicates. But forwarding the information from message B will take 2204 bytes, which exceeds the window size. So the next segment L, transmitted in response to message B, contains only 2048 bytes. The unacknowledged-byte window has thereby been filled and more bytes await transmission, so the server can transmit no further segments until the client acknowledges more transmitted bytes.

Actually, the TCP protocol is slightly more complicated than that: mere acknowledgment is not enough, as the behavior in response to segment M demonstrates. That segment advances the start of the window to byte 3072:it acknowledges receipt of all bytes through byte 3071. But it does not advance the end of the window, because it advertises a window size of 0. A TCP process may respond in that fashion when it has safely received all bytes up to the acknowledgment number but has, say, run out of buffer space. This spares the server re-transmission of previous segments without allowing it to send additional segments; since the end of the window has not advanced, the TCP process still cannot send further segments, even though all previous bytes have been acknowledged. So the server still has data remaining that it cannot send the client, and, in accordance with the present invention, it cannot send the host a pacing response to message D.

Eventually, some space is cleared in the client's buffer, and it so notifies the server by transmitting another acknowledgment segment, segment N. The "ACK 3072" notation shows that this segment is an acknowledgment in form only, since all bytes up to byte 3072 have already been acknowledged. In substance, segment N is instead a window update: the "WIN 2048" advances the end of the unacknowledged-byte window so that the server is permitted to send further segments and thereby increase (from zero in this case) the number of unacknowledged bytes. So the TCP process can now forward the remainder of the data from message B, and it employs segment O for that purpose. In accordance with the present invention, moreover, it can now send the host an appropriate pacing response, message F.

FIG. 4 uses the "IPR" notation for message F in order to give another example of an appropriate pacing response. SNA provides the Independent Pacing Response ("IPR")

message type for cases in which the requesting message's type does not require a response inherently, i.e., in which the message requires no response when it includes no pacing request. SNA provides no response version of such message types, so the IPR message must be used to respond when such messages include pacing requests.

Also, there are some cases in which an IPR is needed even when the requesting message does inherently require a response. Specifically, the inherently required response may be sent while the responding process is not yet able to grant permission for a further window. When that happens, the response's pacing indicator will not be sent. So when the responding process does become able to receive messages again, the sending process must be informed. The IPR message type performs this function.

Instead of an IPR message, some embodiments may use SNA's IPM message type, which additionally specifies a change in window size.

The open window that message N specifies further permits the TCP process to send segments P and Q, which relate to messages D and E, and message F's pacing response enables the host to send the first message G in the next window. The server forwards that message's data in a TCP segment R.

A perusal of the FIG. 4 scenario reveals that the present invention requires no TCP segments or SNA messages that a conventional system would not, yet it limits the server's per-channel storage capacity to less than the size of two pacing windows. So its savings in Internet-Protocol overhead and delay can be considerable, and it thus constitutes a significant advance in the art.

What is claimed is:

1. A computer communications system comprising:
   A) an SNA link
   B) an SNA node, coupled to the SNA link, for transmitting information and SNA pacing requests into an SNA connection that the SNA node maintains over the SNA link;
   C) a TCP/IP link
   D) a TCP/IP node for receiving information from, and transmitting messages that acknowledge transmitted bytes and specify a TCP window size into, a TCP/IP connection that the TCP/IP connection maintains over the TCP/IP link; and
   E) a communications gateway including circuitry for maintaining the SNA and TCP/IP connections with the SNA and TCP/IP nodes, respectively, and:
      i) receiving from the SNA connection the information transmitted by the SNA node;
      ii) forwarding to the TCP/IP node through the TCP/IP connection at least some of the information thereby received;
      iii) monitoring the TCP connection for acknowledgement messages transmitted by the TCP/IP node;
      iv) monitoring the SNA connection for the pacing requests; and
      v) transmitting a pacing response to the SNA node in response to a pacing request therefrom only if forwarding the previously received information not yet forwarded would not result in a number of unacknowledged bytes transmitted into the TCP connection that exceeds the specified window size.

2. A computer communications system as defined in claim 1 wherein the SNA node transmits the information in a 3270 data stream.

3. A computer communications system as defined in claim 1 wherein the communications gateway and the TCP/IP node use the TCP/IP connection to maintain a Telnet connection by which the communications gateway forwards the information to the TCP/IP node.

4. A computer communications system as defined in claim 3 wherein the SNA node transmits the information in a 3270 data stream.

5. A communications method comprising:
   A) transmitting information and SNA pacing requests from an SNA node into an SNA connection maintained by the SNA node;
   B) receiving the information and SNA pacing requests by way of the SNA connection at a communications gateway,
   C) forwarding at least some of the received information by employing the communications gateway to transmit bytes over a TCP connection maintained by the communications gateway;
   D) receiving the forwarded information at a TCP/IP node that maintains the TCP connection with the communications gateway
   E) employing the TCP/IP node to transmit to the communications gateway over the TCP connection acknowledgement messages that acknowledge transmitted bytes and specify a TCP window size;
   F) employing the communications gateway to monitor the TCP connection for the acknowledgement messages;
   G) employing the communications gateway to monitor the SNA connection for request messages that include pacing requests; and
   H) employing the communications gateway to transmit a pacing response over the SNA connection in response to reception of a pacing request from the SNA connection only if forwarding the previously received information would not result in a number of unacknowledged bytes transmitted into the TCP connection that exceeds the specified window size.

6. A method as defined in claim 5 wherein the step of transmitting the information comprises transmitting the information in a 3270 data stream.

7. A method as defined in claim 5 wherein the communications gateway and the TCP/IP node use the TCP/IP connection to maintain a Telnet connection by which the communications gateway forwards the information to the TCP/IP node.

8. A method as defined in claim 7 wherein the step of transmitting the information comprises transmitting the information in a 3270 data stream.

* * * * *